United States Patent
Eberle et al.

(10) Patent No.: US 8,184,629 B2
(45) Date of Patent: May 22, 2012

(54) RELIABLE MULTICAST USING MERGED ACKNOWLEDGEMENTS

(75) Inventors: Hans Eberle, Mountain View, CA (US); Nils Gura, Mountain View, CA (US)

(73) Assignee: Oracle America, Inc., Redwood Shores, CA (US)

( * ) Notice: Subject to any disclaimer, the term of this patent is extended or adjusted under 35 U.S.C. 154(b) by 742 days.

(21) Appl. No.: 11/328,656

(22) Filed: Jan. 10, 2006

(65) Prior Publication Data

US 2006/0114848 A1    Jun. 1, 2006

Related U.S. Application Data

(63) Continuation of application No. 09/659,106, filed on Sep. 11, 2000, now Pat. No. 6,990,098.

(51) Int. Cl.
    *H04L 12/28* (2006.01)
(52) U.S. Cl. .................. 370/390; 709/227
(58) Field of Classification Search ............ 370/236, 370/355, 401, 428, 390; 709/227, 238
    See application file for complete search history.

(56) References Cited

U.S. PATENT DOCUMENTS

| | | | |
|---|---|---|---|
| 5,297,143 A | 3/1994 | Fridrich et al. | |
| 5,444,705 A | 8/1995 | Olnowich et al. | |
| 5,502,756 A | 3/1996 | Crocker et al. | |
| 5,541,927 A | 7/1996 | Kristol et al. | |
| 5,835,723 A | 11/1998 | Andrews et al. | |
| 5,905,871 A | 5/1999 | Buskens et al. | |
| 5,923,662 A * | 7/1999 | Stirling et al. | 370/432 |
| 6,067,567 A | 5/2000 | Bartfai et al. | |
| 6,122,275 A | 9/2000 | Karol et al. | |
| 6,460,120 B1 * | 10/2002 | Bass et al. | 711/148 |
| 6,563,793 B1 * | 5/2003 | Golden et al. | 370/236 |
| 6,865,609 B1 * | 3/2005 | Gubbi et al. | 709/230 |
| 2005/0160345 A1 * | 7/2005 | Walsh et al. | 714/776 |

FOREIGN PATENT DOCUMENTS

EP    0 771 131 A2    5/1997

OTHER PUBLICATIONS

Moon, Sang-Jun et al., "Scalable and reliable ATM multicast employing RM cell consolidation," Electronics Letters, vol. 35, No. 23, Nov. 11, 1999, 2 pages.

* cited by examiner

*Primary Examiner* — Dang Ton
*Assistant Examiner* — Wei Zhao
(74) *Attorney, Agent, or Firm* — Park, Vaughan, Fleming & Dowler LLP

(57) ABSTRACT

Multiple multicast acknowledgements can be merged into a single multicast acknowledgement, thus reducing traffic and reducing logic complexity. An intermediate node that receives multiple multicast acknowledgements merges the multiple acknowledgements into a single acknowledgement, and then supplies the single merged acknowledgment to the multicast source. Encoding of the single merged acknowledgement conveys to the source which of the multicast targets successfully received (or which failed to receive) the multicast information.

18 Claims, 6 Drawing Sheets

RELIABLE MULTICAST USING MERGED ACKNOWLEDGEMENTS

CROSS-REFERENCE TO RELATED APPLICATION(S)

This application is a continuation of U.S. patent application Ser. No. 09/659,106, filed Sep. 11, 2000, entitled "Reliable Multicast Using Merged Acknowledgements" and naming Hans Eberle and Nils Gura as inventors.

BACKGROUND OF THE INVENTION

1. Field of the Invention

The invention relates to communication of information and more particularly to multicast operations.

2. Description of the Related Art

In current computing environments, especially networked environments, a source node on the network may wish to supply a plurality of destination nodes with the same information. In such situations, some systems provide a multicast capability in which the source node can send multiple destination nodes the same information at the same time. In such multicast operations, any number of multiple targets can receive the multicast information.

Referring to FIG. 1, a multicast operation is illustrated in which an initiator node $I_0$ simultaneously sends the same information to target nodes $T_0$, $T_1$, and $T_2$. Because the destination or target nodes can receive the multicast information simultaneously, the multicast operation is time efficient.

One difficulty with multicasting simultaneous information is that it may be difficult for the initiator node who sends the information to determine if the target nodes successfully received the information. Thus, the operation is unreliable in the sense that the initiators cannot determine if the transmission was successful. If the receiving nodes send acknowledgements indicating successful receipt of the multicast information, there would be a tendency for the acknowledgements to collide or otherwise contend for resources of the communication medium. That is because the targets would likely send the acknowledgements to the initiator node at the same time. In a switched synchronous network, sending such acknowledgements could result in undesirable collisions and possible loss of acknowledgement information. In other systems, the acknowledgements may be buffered within the switch as collisions occur, or require retry as some targets would be unable to obtain the communication medium to send the acknowledgement. In either of those situations, the advantage of time efficiency is diminished if acknowledgements take a long time relative to the original multicast due to contention for resources of the communication medium connecting the sending and receiving nodes.

One way to avoid such contentions and/or collisions is to provide the information sequentially as shown in FIG. 2, rather than simultaneously, as shown in FIG. 1. In the sequential operation, the initiator node $I_0$ successively sends the same information at 201, 202 and 203 to the target nodes $T_0$, $T_1$, and $T_2$. The target nodes respond sequentially with acknowledgements at 204, 205 and 206. Because the acknowledgements are sequential, they do not compete with each other for communication medium resources. Thus, the operation is reliable in the sense that the initiator can determine if the transmission was successful. However, the sequential nature of the operation for both the transmission of the information and the transmission of the acknowledgements eliminates any efficiency which could be gained from a true multicast operation in which multicast information is sent simultaneously. Thus, there is a relatively long latency for completion of the entire operation.

For certain time-critical multicast operations, it is important to minimize latency. For example, for time-critical multicast operations such as synchronization of clocks in a network, coherency protocols, and operations in databases/transaction systems such as commit or abort, minimizing latency would be advantageous.

SUMMARY OF THE INVENTION

It has been discovered that merging a plurality of multicast acknowledgements into a single multicast acknowledgement reduces multicast traffic while preserving information of the plurality of acknowledgements. An intermediate node encodes multiple acknowledgements into a single acknowledgement. For example, the intermediate node logically combines the acknowledgements, selects particular bits from the acknowledgments to form a vector, etc. Each bit position in the single merged acknowledgment represents one of the targets of a multicast. Setting the bit at each position allows indication of which targets successfully (or unsuccessfully) received the multicast in a single encoding.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Although the following description refers to acknowledgements in many of the examples, the same can be applied to negative acknowledgements.

Figure 1:
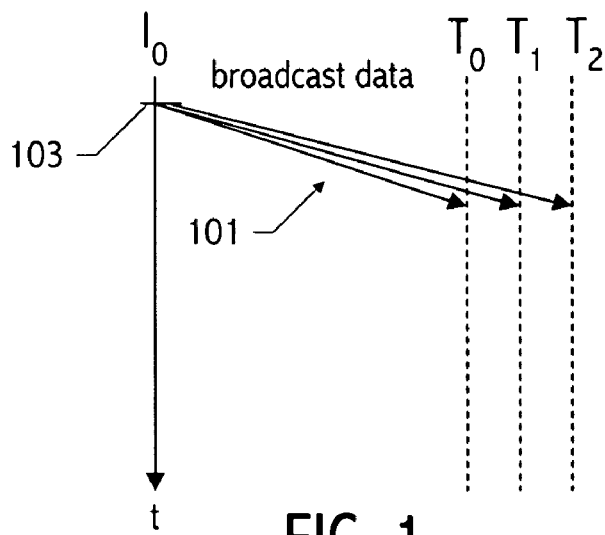
FIG. 1 illustrates operation of an unreliable multicast operation in which no acknowledgements are provided by the targets.
Figure 2:
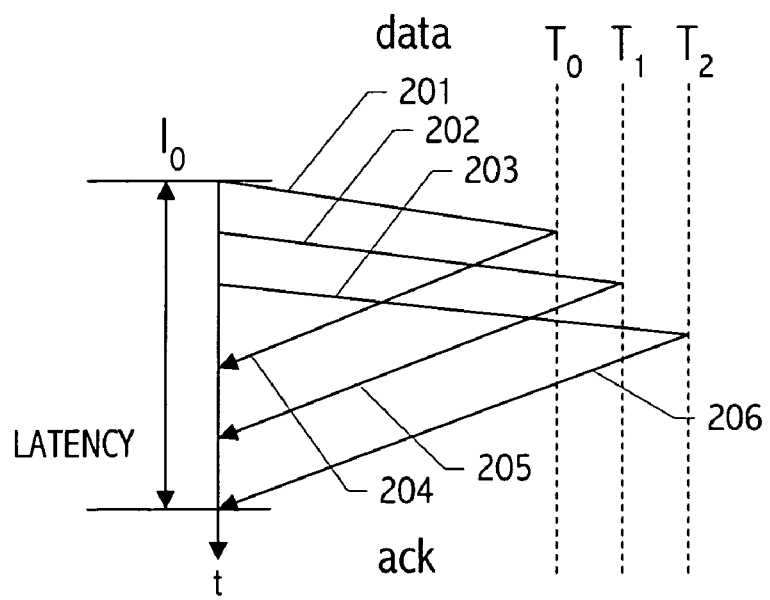
FIG. 2 illustrates operation of sequential operation.
Figure 3:
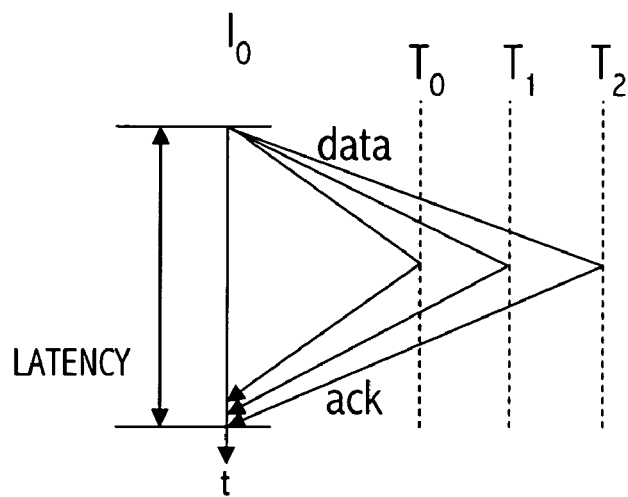
FIG. 3 illustrates operation of a reliable simultaneous multicast operation.

Referring to FIG. 3, operation of a reliable multicast operation is illustrated. Assume the system includes multiple nodes including the illustrated initiator node $I_0$ and three target nodes $T_0$, $T_1$ and $T_2$. The initiator node $I_0$ sends information (data) to the three targets $T_0$, $T_1$ and $T_2$ simultaneously, i.e., the initiator node $I_0$ multicasts the information to the three targets. Each target, assuming successful receipt, sends back an acknowledgement (ack) to the initiator node $I_0$. As described further herein, in order for the initiator node $I_0$ to receive the simultaneously sent acknowledgements, the acknowledgements are merged and then provided to the initiator node. The merger operation is described further herein.

Figure 4:
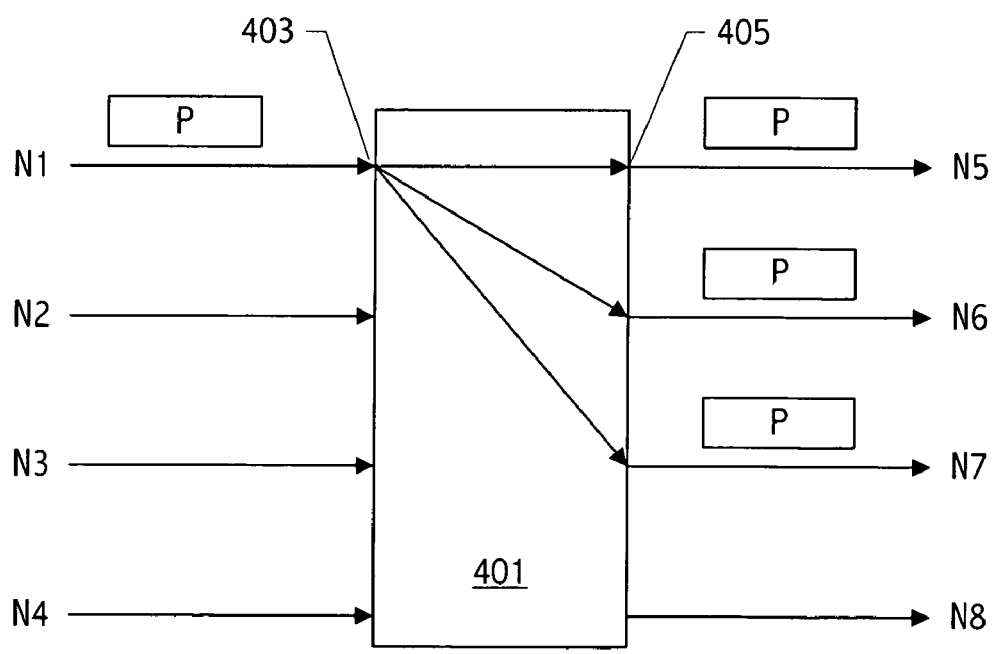
FIG. 4 illustrates an embodiment in which a multi-port switch is used for a multicast operation.

Referring to FIG. 4, the first part of a reliable multicast operation according to an embodiment of the invention is illustrated. In the first part of the multicast operation, the multicast information in the form of packet(s) P, is sent from initiator node N1 through input port 403 to target nodes N5, N6 and N7 across multiport switch 401. Note that packet(s) P may be one or more packets comprising one or more bytes of data and/or control information.

Figure 5:
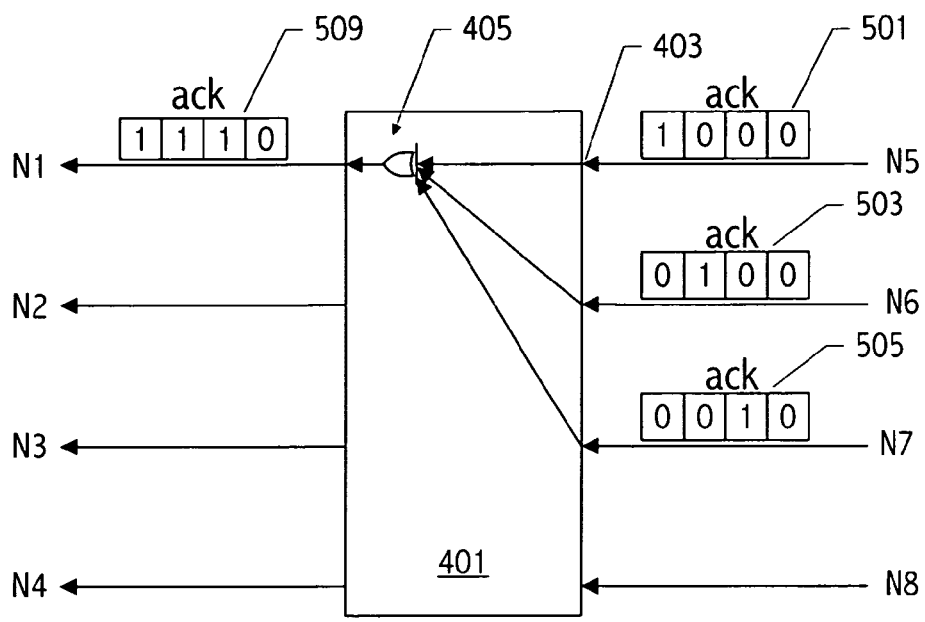
FIG. 5 illustrates an embodiment in which a multi-port switch is used to merge the acknowledgements, which indicate successful completion of the multicast operation.

Referring to FIG. 5, the acknowledge phase of the multicast operation is illustrated. Nodes N5, N6 and N7, which received the multicast packet(s) P, respectively send acknowledge packets (ack) 501, 503 and 505 to node N1, which sent the multicast packet(s) P. Note that the exemplary acknowledge packets are shown in simplified form without information such as address, type of operation or other control information that would typically be associated with such a packet. Further note that a host typically contains both an initiator node and a target node and that the initiator and target share the input and output port of the switch. For example, N1 and N5 belong to the same host and send packets to input port 403 and receive packets from output port 405.

The exemplary multiport switch 401 includes four possible inputs and four possible outputs. Thus, in the embodiment illustrated in FIG. 5, the acknowledge packet (ack) from each multicast target node includes a vector of four bits, one bit corresponding to one of four possible output ports or targets on the switch. As illustrated in FIG. 5, the leftmost bit in the vector corresponds to node N5, the next bit to node N6, etc. Thus, when node N5 acknowledges the multicast, it sets the leftmost bit in its acknowledge vector 501 to indicate that N5 successfully received the multicast packet(s) P. Node N6 sets the bit second from the left in its acknowledge vector 503 to indicate that it successfully received the multicast packet(s) P. Node N7 sets the bit third from the left in its acknowledge vector 505.

Output port 405 merges the acknowledge packets received respectively from nodes N5, N6 and N7. As illustrated in FIG. 5, that can be accomplished by ORing together the acknowledge packets in OR logic in output port 507. When ORed together the merged acknowledgement packet 509 is generated and supplied to node N1. Node N1 can determine from the three bits set in merged acknowledge packet 509 that nodes N5, N6 and N7 successfully received the multicast packet(s) P. Thus, multiport switch 401 can provide a reliable and efficient multicast operation, since the acknowledge packets can be sent over the switch efficiently. That is made possible by the merging implemented in the output port.

Figure 6:
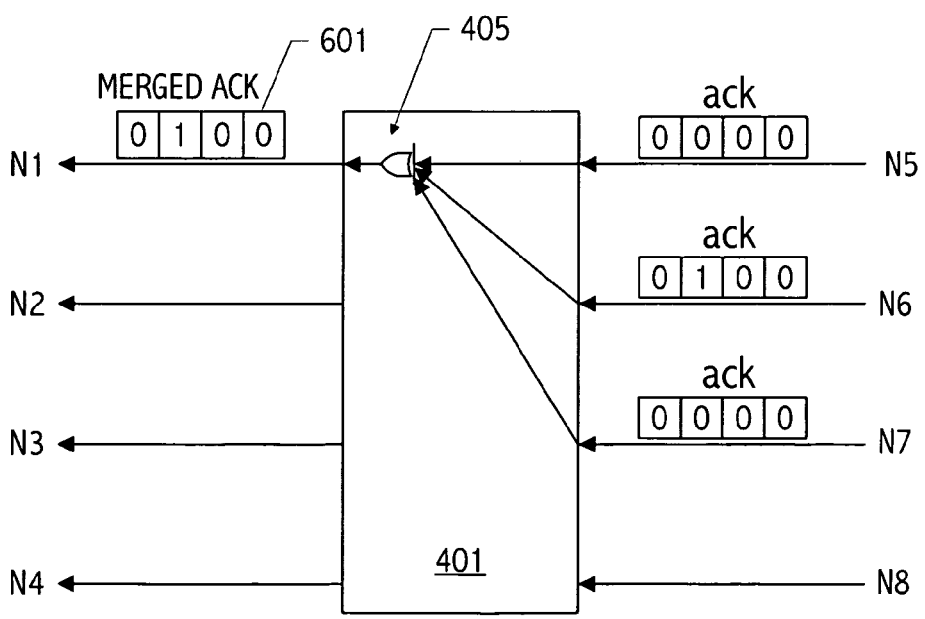
FIG. 6 illustrates an embodiment in which a multi-port switch is used to merge the acknowledgements, which indicate a failed multicast operation.

Referring to FIG. 6, another operation of the multicast acknowledge is illustrated when some of the target nodes of the multicast operation fail to correctly receive the multicast packet P. That may be the result of, e.g., uncorrectable errors detected by the receiving node. As can be seen, only node N6 correctly received the multicast packet(s) P as indicated by the "0100" in its acknowledge packet. When the acknowledge packets from N5, N6 and N7 are ORed together, merged acknowledge packet 601 results which indicates that errors were detected by two nodes (N5 and N7). Using that information, the node initiating the multicast node can take appropriate action in response to the detected errors, such as resending the multicast packet P to the nodes that failed.

Figure 7:
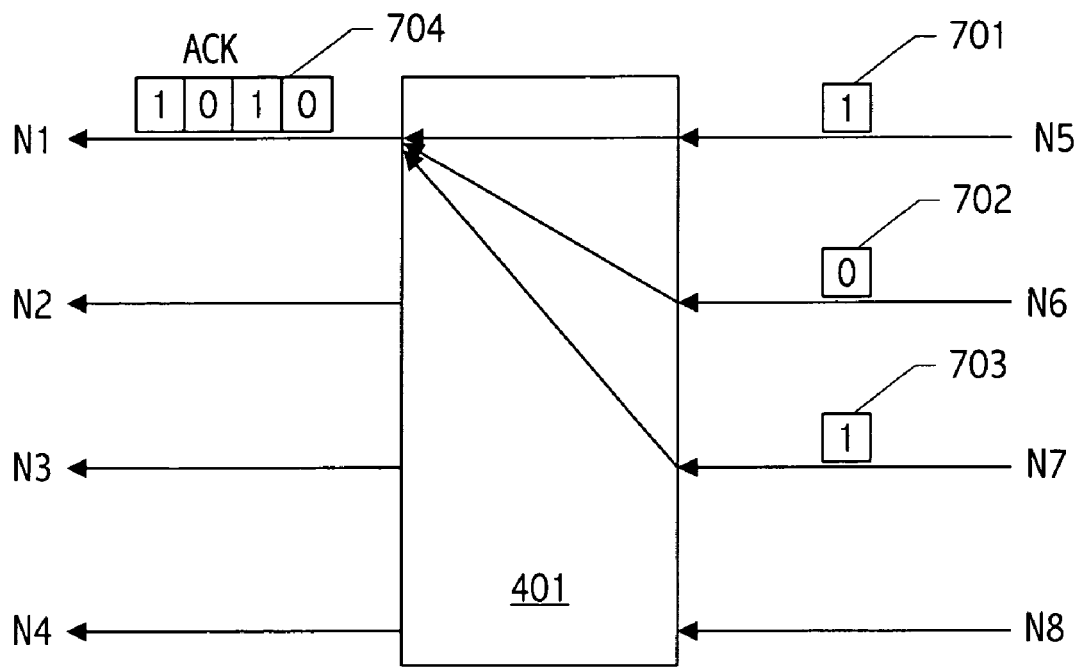
FIG. 7 illustrates how single-bits can be concatenated into a vector.
Figure 7:
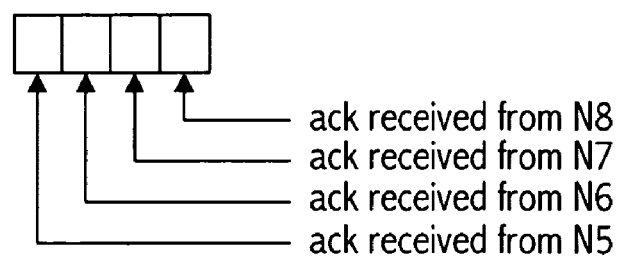

As would be known in the art, there are many other ways to encode the sources of the acknowledgements and to merge the acknowledge packets. For example, while the OR operation is possible, an embodiment could simply select the relevant bit from each output port acknowledge vector for inclusion in a merged acknowledge vector. Referring to FIG. 7, an example is shown in which single bits from each of the targets is merged into a vector. More particularly, each bit 701, 702 and 703 is concatenated to form vector 704, which is presented to the source to indicate which targets successfully received the multicast data. Alternatively, the switch could provide a count of the number of acknowledging multicast targets that indicated successful receipt, although that implementation would likely require more logic.

In a typical system, the input ports (or the control logic associated with the input ports) are aware of the multicast operation from information contained in a packet header. From that information, the control logic knows to connect the input port to the appropriate output ports. There are various approaches that could be used to alert the output port to merge the acknowledgements received by the input ports from the various targets. For example, an acknowledge packet may be marked as a multicast acknowledgement. Assuming that the packets to be merged arrive at the input ports simultaneously, the output port merges those packets that are destined for it and appropriately marked. Alternatively, e.g., in a pipelined network, the switch can remember that it scheduled a multicast data transfer and merge the acknowledge packets at a particular pipeline stage in the future. It is also possible for acknowledge packets destined for the same port to merge packets whenever there exists multiple acknowledge packets for the same output port. That assumes that acknowledge packets to be merged arrive simultaneously. Thus, a multicast acknowledge would be presumed in such situations. Note that the switch settings for forwarding the acknowledgements can be inferred from settings for forwarding the multicast data.

Figure 8:
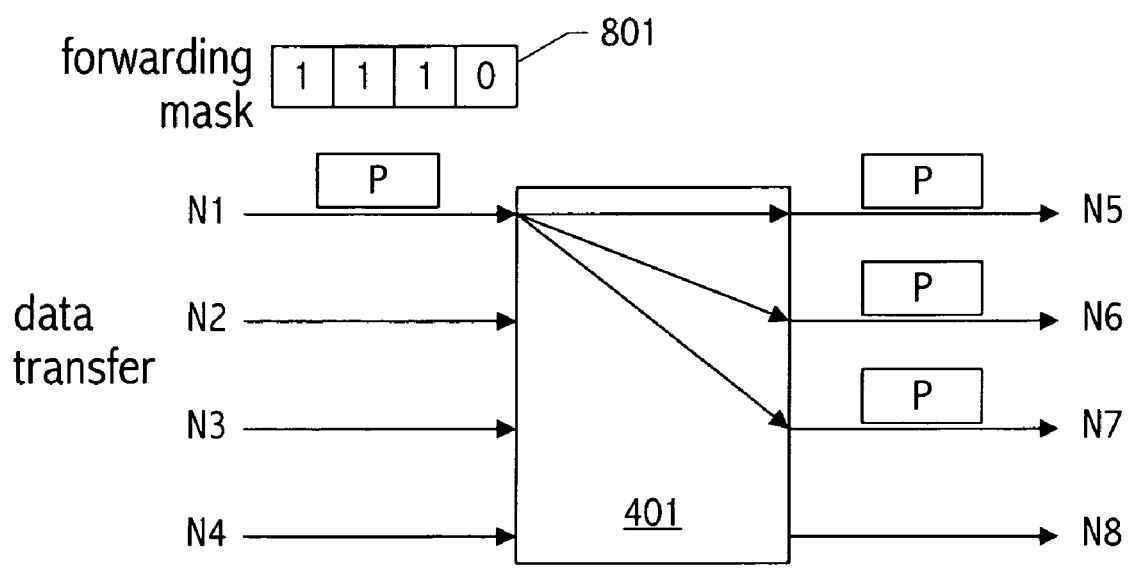
FIG. 8 illustrates the transmission portion of a merged single-bit acknowledgement approach.
Figure 9:
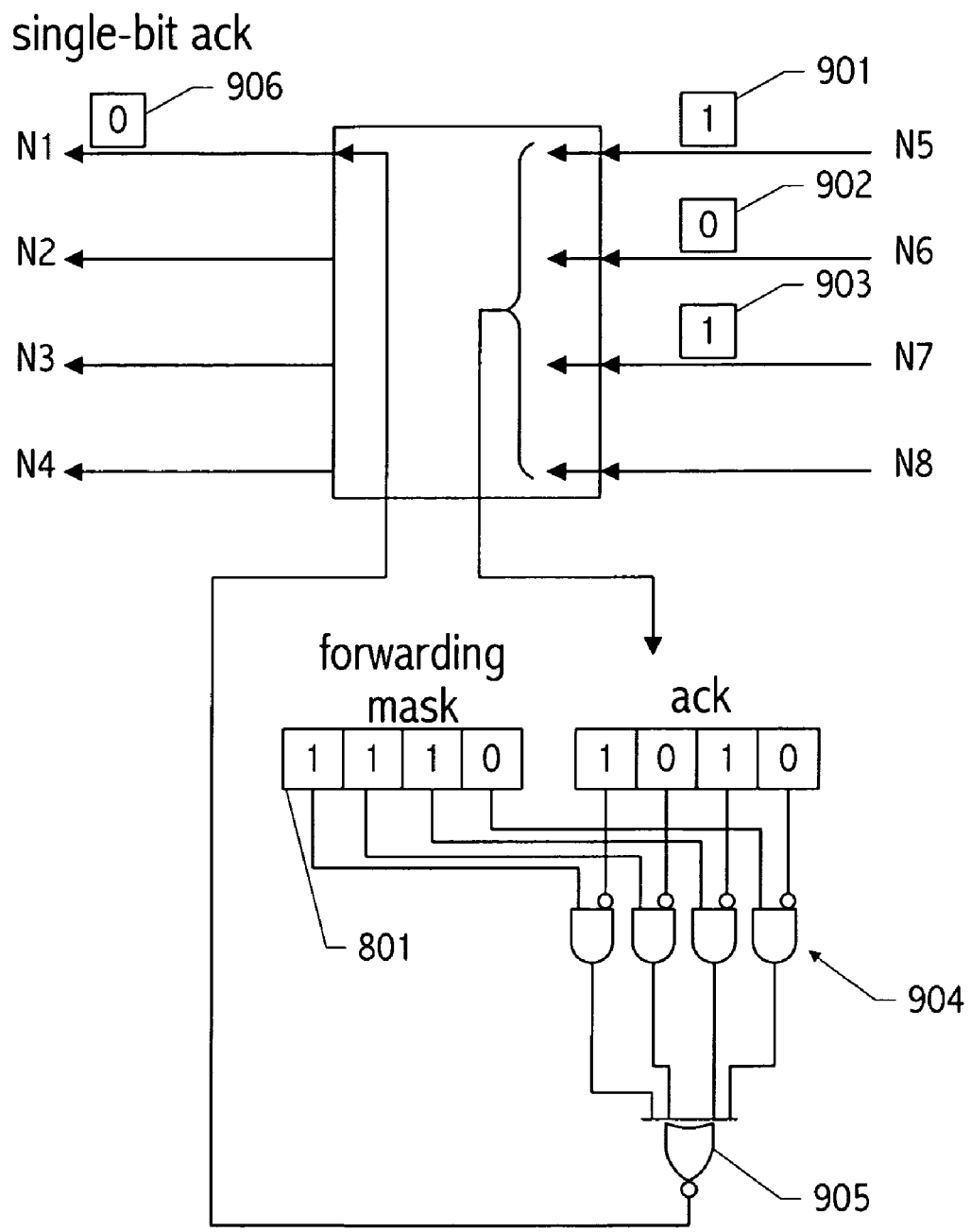
FIG. 9 illustrates the acknowledgement portion of the merged single-bit acknowledge operation.

It is also possible to merge acknowledge packets into an acknowledge packet containing a single bit rather than a bit vector, which is then forwarded on to the initiator node. Atomic operations are one application for a merged single bit acknowledge. Referring to FIGS. 8 and 9, operation of a merged single bit acknowledge is illustrated. In FIG. 8 a multicast operation sends data from initiator node N1 to target nodes N5, N6 and N7. A forwarding mask 801 is generated that indicates which of the possible targets received the multicast data. That forwarding mask is utilized in merging the acknowledgements into a single bit as illustrated in FIG. 9.

Referring to FIG. 9, node N5 sends back acknowledgement 901, node N6 sends back acknowledgement 902, and node N7 sends back acknowledgement 903 as shown. Note that acknowledgement 902 indicates that node N6 failed to properly receive the multicast data. The merging is accomplished as follows. The individual acknowledgements are inverted and logically combined in AND gates 904 with the forwarding mask 801. The output of AND gates 904 are then logically combined in NOR gate 905 to provide the single bit acknowledgement 906 to the initiating node N1. In the example illustrated in FIG. 9, the zero acknowledgement 902 from node N6 causes the single bit acknowledgement to be a zero indicating that a failure occurred. Note that while the acknowledgements 901, 902, and 903 from nodes N5, N6 and N7 are shown as single bits, as one of ordinary skill in the art would understand the acknowledgements can be in the various forms, e.g., an acknowledge packet indicating successful receipt or an acknowledge packet indicating unsuccessful receipt (NACK). Further, the acknowledgement 906 can also be in the form of an acknowledge packet indicating successful transmission or no acknowledge (nack) packet indicating transmission failure. An important aspect of this embodiment is that the overall success or failure of the multicast is encoded in a single bit (or bits) without providing information regarding individual multicast success or failure of the targets.

Other acknowledgement variations are also possible. For example, fine-grained acknowledgements may be used in which separate bits are provided, e.g., for CRC error, permission error, buffer overflow, etc. Thus, an exemplary system combines the individual bits, e.g., for CRC error, for all the acknowledging targets. Again, individual bits can be merged into either a bit vector or a single bit. In the later case, one bit of the merged acknowledgements represent the CRC errors from all the targets, one bit represents all the permission errors etc. The initiator node would know whether or not all targets successfully received the packet with or without a CRC error, or permission error, etc.

Thus, an efficient and reliable multicast operation has been described. While described in relation to a multiport switch, any switching medium that can effectively merge the multicast acknowledges can effectively utilize the invention described herein.

The embodiments described above are presented as examples and are subject to other variations in structure and implementation within the capabilities of one reasonably skilled in the art. The details provided above should be interpreted as illustrative and not as limiting. Variations and modifications of the embodiments disclosed herein may be made based on the description set forth herein, without departing from the scope and spirit of the invention as set forth in the following claims.

What is claimed is:

1. A method of multicasting, comprising:
receiving multicast acknowledgements transmitted from a subset of a plurality of multicast targets, wherein the plurality of multicast targets comprises N multicast targets, wherein each acknowledgement comprises a vector of N bits, and wherein each multicast target sends a separate acknowledgement with a different one of the N bits in the vector in the separate acknowledgement set to indicate an acknowledgement from the corresponding multicast target;
encoding a single acknowledgement from the received multicast acknowledgements, wherein encoding the single acknowledgement comprises performing a logical operation to merge the N-bit vectors in each of the received multicast acknowledgements into the single acknowledgement that comprises a vector of N bits, and wherein a given bit in the vector of N bits in the single acknowledgement is set to indicate that the corresponding multicast target successfully received previously-multicasted information or unset to indicate that the corresponding multicast target did not successfully receive previously-multicasted information; and
supplying the single acknowledgement to a source of the multicasting, wherein the plurality of multicast targets includes the acknowledging multicast targets.

2. The method as recited in claim 1 further comprising counting the number of acknowledging multicast targets and supplying the count to the source.

3. The method as recited in claim 1, wherein the multicast information is sent across an intermediate node to the plurality of targets.

4. The method as recited in claim 3, wherein the intermediate node comprises one of a switch, a router, and a bridge.

5. The method as recited in claim 3, wherein the intermediate node comprises a synchronous switch and all acknowledgements are received by the switch at the same time.

6. The method as recited in claim 1, wherein the single acknowledgement is supplied in an acknowledgement packet encoding identities of the acknowledging multicast targets.

7. The method as recited in claim 1, wherein the single acknowledgement indicates whether all of the plurality of targets successfully received the multicast information.

8. The method as recited in claim 7 further comprising obviating an indication of individual acknowledging multicast targets if all of the plurality of multicast targets successfully received the multicast information.

9. The method as recited in claim 7, wherein the single acknowledgement includes a single bit indicating whether all of the targets successfully received the multicast information.

10. The method as recited in claim 1, wherein the acknowledgements comprise fine grain acknowledgements that have separate indications of one or more of CRC error, permission error, and buffer overflow, which are also encoded into the single acknowledgement.

11. A non-transitory computer readable storage medium storing instructions that, when executed by a computer, cause the computer to perform a method for multicasting, the method comprising:
receiving multicast acknowledgements transmitted from a subset of a plurality of multicast targets, wherein the plurality of multicast targets comprises N multicast targets, wherein each acknowledgement comprises a vector of N bits, and wherein each multicast target sends a separate acknowledgement with a different one of the N bits in the vector in the separate acknowledgement set to indicate an acknowledgement from the corresponding multicast target;
encoding a single acknowledgement from the received multicast acknowledgements, wherein encoding the single acknowledgement comprises performing a logical operation to merge the N-bit vectors in each of the received multicast acknowledgements into the single acknowledgement that comprises a vector of N bits, and wherein a given bit in the vector of N bits in the single acknowledgement is set to indicate that the corresponding multicast target successfully received previously-multicasted information or unset to indicate that the corresponding multicast target did not successfully receive previously-multicasted information; and
supplying the single acknowledgement to a source of the multicasting, wherein the plurality of multicast targets includes the acknowledging multicast targets.

12. An apparatus comprising:
a set of one or more network interfaces to receive and to transmit, wherein the set of one or more network interfaces are configured to receive multicast acknowledgements transmitted from a subset of a plurality of multicast targets, wherein the plurality of multicast targets comprises N multicast targets, wherein each acknowledgement comprises a vector of N bits, and wherein each multicast target sends a separate acknowledgement with a different one of the N bits in the vector in the separate acknowledgement set to indicate an acknowledgement from the corresponding multicast target; and
means for encoding the received multicast acknowledgements into a single multicast acknowledgement wherein encoding the single acknowledgement comprises performing a logical operation to merge the N-bit vectors in each of the received multicast acknowledgements into a single acknowledgement that comprises a vector of N bits, and wherein a given bit in the vector of N bits in the single acknowledgement is set to indicate that the corresponding multicast target successfully received previously-multicasted information or unset to indicate that the corresponding multicast target did not successfully receive previously-multicasted information.

13. The apparatus of claim 12 further comprising means for merging indications of one or more of CRC error, permission error, and buffer overflow from the plurality of multicast acknowledgements.

14. A network node comprising:
a plurality of ports to receive and to transmit multicast information, wherein the plurality of ports are configured to receive multicast acknowledgements transmitted from a subset of a plurality of multicast targets, wherein the plurality of multicast targets comprises N multicast targets, wherein each acknowledgement comprises a vector of N bits, and wherein each multicast target sends a separate acknowledgement with a different one of the N bits in the vector in the separate acknowledgement set to indicate an acknowledgement from the corresponding multicast target; and
multicast acknowledgement merging logic coupled with the plurality of ports, wherein the logic is configured to generate a merged multicast acknowledgement from the received multicast acknowledgements, wherein generating the merged multicast acknowledgement comprises performing a logical operation to merge the N-bit vectors in each of the received multicast acknowledgements into a single acknowledgement that comprises a vector of N bits, and wherein a given bit in the vector of N bits in the single acknowledgement is set to indicate that the corresponding multicast target successfully received previously-multicasted information or unset to indicate that the corresponding multicast target did not successfully receive previously-multicasted information.

15. The network node of claim 14, wherein the network node includes one or more of a router, a switch, and a bridge.

16. The network node of claim 14, wherein indication of the acknowledging target nodes comprises indicating those of the plurality of ports that correspond to acknowledging target nodes.

17. The network node of claim 14, wherein indication of the acknowledging target nodes comprises identifying the acknowledging target nodes.

18. The network node of claim 14 further comprising the multicast acknowledgement merging logic to merge multicast acknowledgements to indicate whether the multicast was successful for all targets of the multicast.

* * * * *